UNITED STATES PATENT OFFICE.

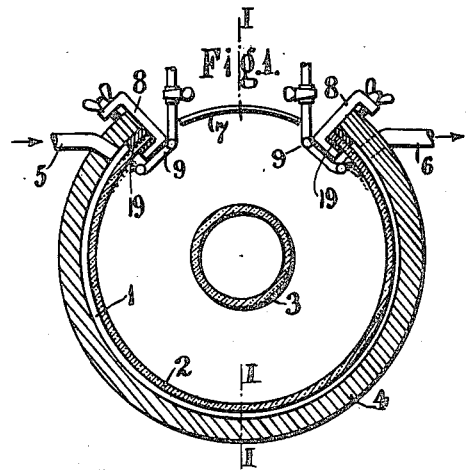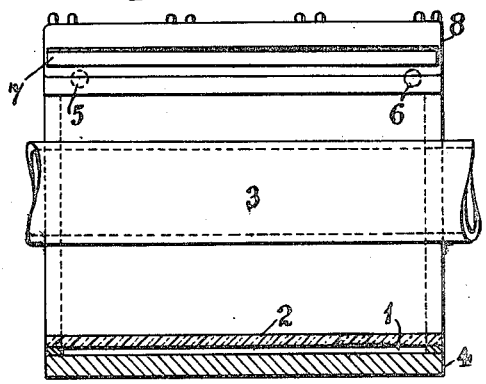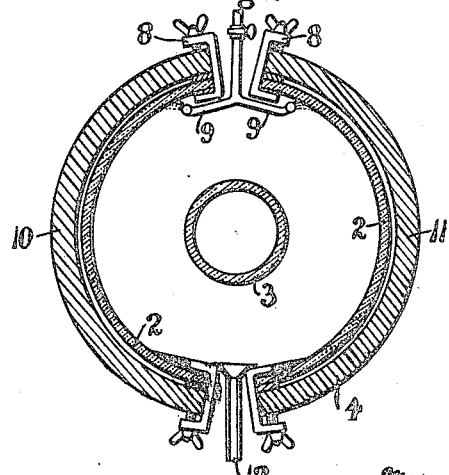

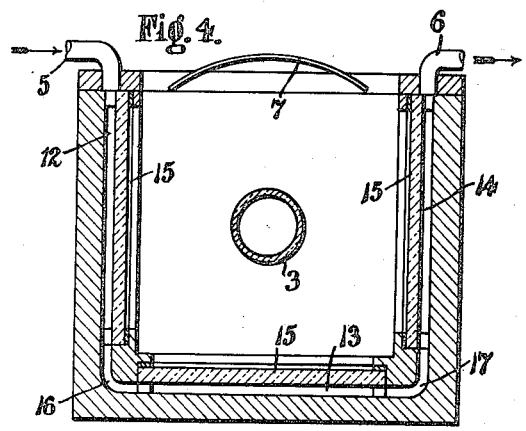
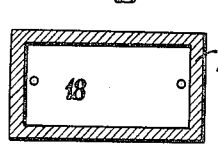
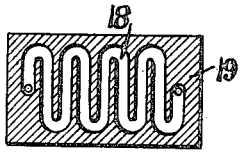
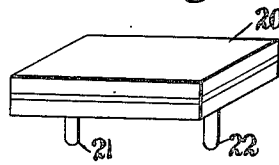
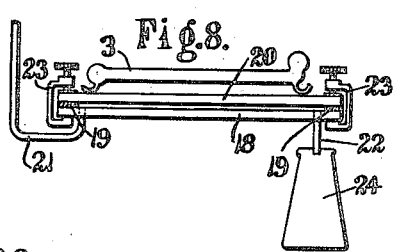
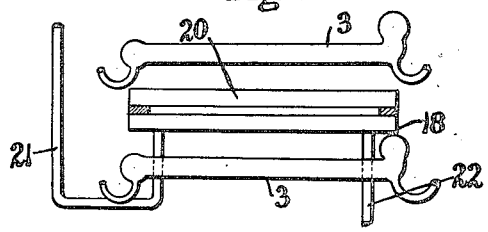

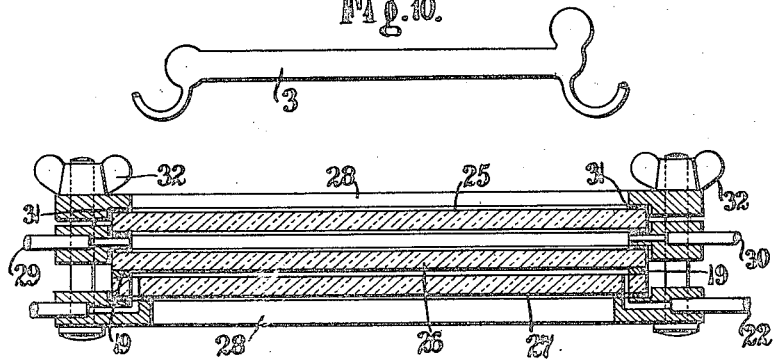
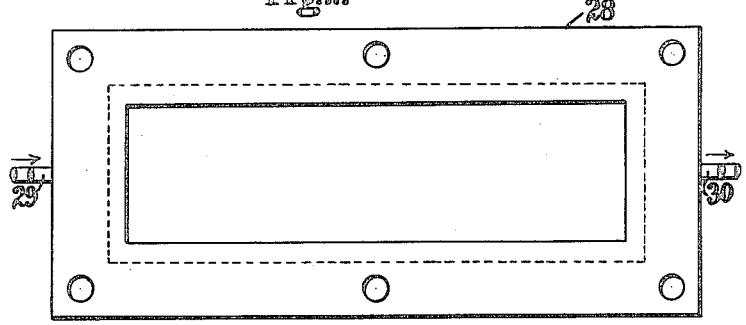
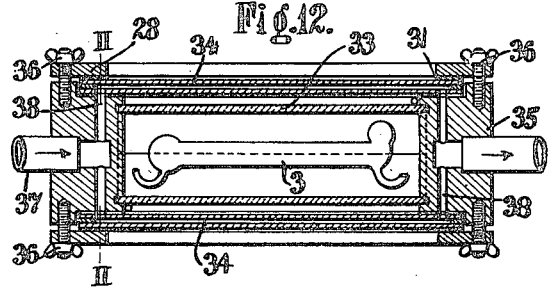
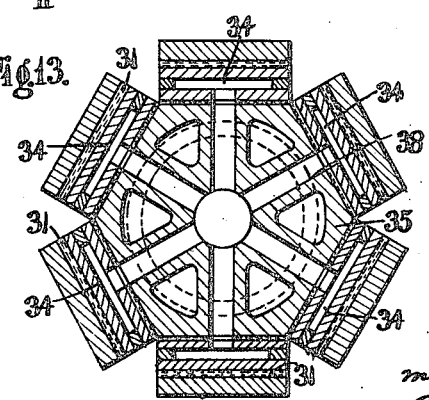

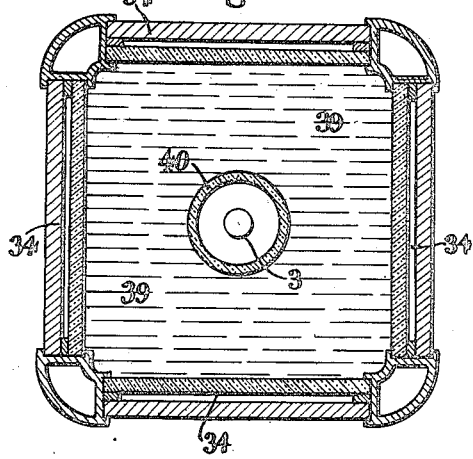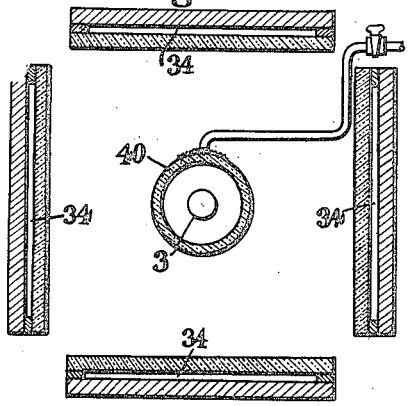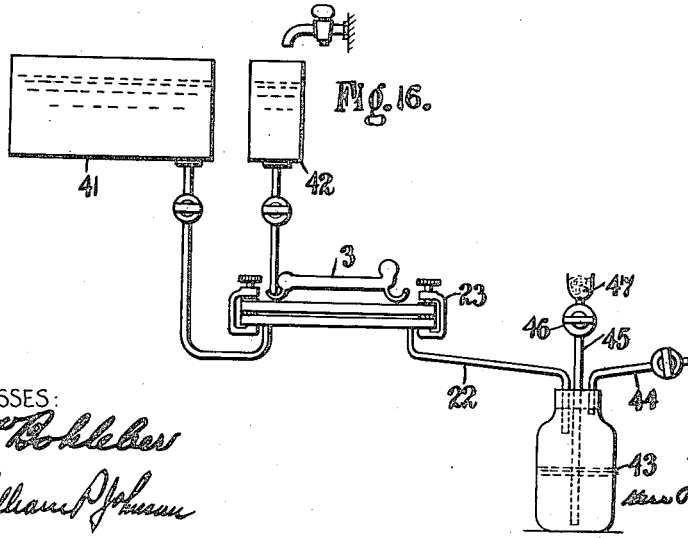

VICTOR HENRI, ANDRÉ HELBRONNER, AND MAX VON RECKLINGHAUSEN, OF PARIS, FRANCE, ASSIGNORS, BY MESNE ASSIGNMENTS, TO THE R. U. V. COMPANY, INC., A CORPORATION OF NEW YORK.

APPARATUS FOR TREATING LIQUIDS WITH ULTRA-VIOLET RAYS.

1,145,140.          Specification of Letters Patent.       Patented July 6, 1915.

Application filed July 31, 1911. Serial No. 641,478.

*To all whom it may concern:*

Be it known that we, VICTOR HENRI and ANDRÉ HELBRONNER, citizens of the Republic of France, and MAX VON RECKLINGHAUSEN, a subject of the Emperor of Germany, residing at Paris, France, have invented new and useful Improvements in Apparatus for Treating Liquids with Ultra-Violet Rays, of which the following is a specification.

This invention relates to the treatment of liquids by means of ultra-violet rays especially liquids that are somewhat opaque to the rays, and has for its object the construction of apparatus suitable for this purpose.

In sterilizing water and other liquids that are not opaque to the ultra-violet rays, the liquid may be submitted to the action of the rays in open troughs of considerable depth. In the case, however, of liquids such as milk or liquids which are deeply colored, liquids containing substances in suspension, and emulsions it is necessary to conduct the operation while the liquid is in the form of a thin film on account of its opacity to the rays.

In the specification filed with our application for United States Patent, Serial No. 608,473, filed 13th Feby., 1911, we have described an apparatus for treating liquid by means of ultra-violet rays, in which the liquid is caused to pass through a shallow closed channel preferably of circular cross section, which is provided with a top side of mica, quartz, Uviol glass, this being a special kind of glass manufactured by Messrs. Schott & Genossen of Jena, which permits the passage of the rays, or any other suitable material, which is translucent to ultra-violet rays. In the present invention we provide an improved construction of this apparatus by forming the same of two plates, one of which is composed of material permeable to ultra-violet rays, with a ring of material separating the plates and means for clamping the two plates together, so as to form a shallow channel. Suitable openings to which inlet and outlet pipes may be connected are provided in either or both plates, and said plates may be either curved or plane, as found most convenient.

In using the apparatus, the liquid to be treated, milk, for instance, is preferably located at a higher level than the treating apparatus, and the latter may also be connected to a vacuum pump, so that the rate at which the liquid passes through the apparatus may be controlled.

In order to utilize to their fullest extent the rays emitted by the source a number of containers, constructed as above described, may be located around the source and the liquid may be caused to pass through the same in parallel or in succession, as desired.

In some cases it may be desirable in order to insure a thorough treatment of the liquid by the rays to provide both a base-plate and cover of a material permeable to ultra-violet rays and to locate a lamp on both sides of the container thus formed so that the film of liquid is exposed to ultra-violet rays on both sides.

The invention will be clearly understood by the following description taken in conjunction with the accompanying drawings in which—

Figure 1 is a vertical section of a cylindrical apparatus the lamp being supported approximately at the center. Fig. 2 is a section on the line I—I, Fig. 1. Figs. 3 and 4 are vertical sections of modified forms of the apparatus shown in Fig. 1. Figs. 5 and 6 are plan views of the flat plates and borders, used in the construction of the apparatus, Fig. 7 being a perspective view showing the plates fitted together. Fig. 8 is a sectional elevation showing how the apparatus is used, and Fig. 9 shows in elevation an arrangement with a lamp at each side; Figs. 10 and 11 are a vertical section and plan view respectively drawn to an enlarged scale showing a method of clamping the plates together; Fig. 12 is a vertical section of an arrangement of the apparatus completely surrounding the lamp, Fig. 13 being a vertical section on the line II—II, Fig. 12; Figs. 14 and 15 show alternative arrangements for cooling purposes and Fig. 16 is a general view of the apparatus showing an arrangement for supplying the liquid and collecting it after treatment.

Referring now to Figs. 1 and 2, a shallow channel indicated at 1 is formed by two plates, one of which marked 2 consists of mica, quartz, Uviol glass or the like, and the other of which marked 4 may be of metal glass porcelain or other suitable material. These plates, which are substantially circular in cross section, are separated by strips 19 of paper, rubber or other suitable material of such a thickness as will form a channel of the desired depth. The plates are secured together by the clamps 8, so as to form a hermetically sealed chamber. The liquid to be treated enters the chamber by the inlet pipe 5 and leaves it by the outlet pipe 6. The source of ultra-violet rays,— a mercury vapor lamp having a quartz container 3, for example,—is located at or about the axis of the circular channel, so that the ultra-violet rays emitted radially therefrom pass through the permeable window 2 and act upon the liquid. A reflector 7 may be provided, as shown, in order to prevent the ultra-violet rays from passing away to the atmosphere without being utilized. For the purpose of cooling the plate 2 water may be sprayed thereon from the pipes 9, so that it runs down in a thin film and by inclining the apparatus slightly it may be led away at one end of the same.

According to the arrangement shown in Fig. 3 the apparatus is composed of two substantially semi-cylindrical parts 10 and 11 through which the liquid may be passed in series or in parallel. In this construction the water used for cooling can be collected and led away by the pipe 12 as shown.

In the modified form shown in Fig. 4 the apparatus instead of being cylindrical in shape is built up of a number of flat channels 12, 13, and 14, each of which is provided with a cover plate 15 made of a material such as rock-crystal transparent to the ultra-violet rays. These channels are arranged around the lamp 3 and the liquid passes through them in succession, by means of the connecting passages 16 and 17. In the case, however, of liquid such as milk, which in order to obtain thorough sterilization must be exposed to ultra-violet rays in the form of an exceedingly thin film, a film of the thickness of paper may be obtained by providing the plate 18 with a plane surface and placing around the edge a ring of paper 19. Instead of paper other suitable material may be employed of any desired thickness and outline, and in some cases it may be desirable to change the direction of the flow of the liquid while it is exposed to the rays emitted by a single lamp, in which case a suitable outline would be of zigzag form as shown in Fig. 6. The bottom plate on which the ring of paper is placed may be of metal or other suitable material and on top thereof a flat sheet 20 of quartz, rock crystal or other suitable material is applied and the two plates with the separating ring are firmly clamped or otherwise secured together. By this means a cavity between the base and the quartz sheet will be formed the depth of which is equal to the thickness of the ring. Suitable inlet and outlet pipes 21 and 22 may be readily connected to the back plate. The plates may be of any suitable form and we are not restricted to the use of flat plates for this purpose. The plates may be secured together in any convenient manner and for this purpose clamps 23 may be employed as shown in Fig. 8. The base plate 18 in this instance might consist of rock-crystal and the lamp 3 is mounted as near as possible to the cover 20 also of rock crystal. The liquid is forced through the cavity between the plates and collected in the receiver 24. As in this case both the top and bottom plates are permeable to ultra-violet rays and some of the rays pass completely through the liquid, the receiver is within the sphere of influence of the rays so that there is no risk of re-infection taking place. If desired two lamps may be used, one supported above the top plate and the other supported below the bottom plate so that the film of liquid between the two plates is exposed to the rays on both sides as shown in Fig. 9.

Figs. 10 and 11 show how the plates may be hermetically secured together, in this case, the three plates 25, 26 and 27 are mounted in a rectangular frame 28 a cavity being provided between the plates 25 and 26 through which water for cooling purposes may be passed, an inlet pipe 29 and an outlet 30 being provided for this purpose in the frame. Plates 26 and 27 are separated by paper or other suitable packing material and a cavity is formed of such dimensions that a film of the desired thickness is obtained when the liquid to be treated is passed through. The thickness of the film will be determined by the thickness of the paper packing 19. The frame in which the plates are mounted is composed of several sections, rubber or other suitable packing 31 being provided between the sections of the frame and the plates in order to allow of expansion of the latter. The cavities through which the cooling water and liquid under treatment are passed are hermetically closed by means of the clamping bolts 32. An inlet pipe for the liquid to be treated may conveniently be provided leading to an opening in the lowest of the three plates and an outlet of similar form is provided at the other side of the apparatus.

In the modified form of the arrangement shown in Figs. 12 and 13 the lamp 3 is mounted in a tube or cylinder 33 constructed in two sections of material permeable to the ultra-violet rays. Around this cylinder a number of containers 34 constructed as above described are mounted surrounding the lamp, for instance in the form of a hexagon as shown in Fig. 13. The containers 34 are mounted in a frame 35 in such a manner that the outer plate of each container can be readily detached. As shown, screws 36 are provided on the frame by means of which the outer plate can be screwed down on to the base plate, rubber or other suitable packing 31 being provided between the frame and plate. The liquid is admitted at one end of the apparatus by the inlet pipe 37 and passes in parallel streams through the independent containers 34 by way of the radially arranged passages 38. Between the cylinder 33 and the actual treating chambers water may be circulated in order that the liquid that is being treated shall not be heated by the rays emitted by the lamp. This form of apparatus utilizes the rays emitted by the lamp on all sides and is therefore economical.

Alternative arrangements for cooling the liquid in the treating chambers are shown in Figs. 14 and 15. In this instance four chambers 34 are provided surrounding the lamp 3 and the whole of the interior space 39 between the lamp and the treating chambers is filled with water. Since water is more permeable to ultra-violet rays than air there is in this arrangement little loss of ultra-violet rays although the efficiency of the lamp suffers from the excessive cooling. This drawback can, however, be avoided by providing the lamp with an outer jacket 40, the intermediate space between the lamp and jacket being exhausted to a high vacuum as described in the specification accompanying our application for Letters Patent Serial No. 565612 filed June 7th, 1910. The space between the outer jacket and the treating chambers may be completely filled with water or a stream of water may be allowed to play on the jacket 40 as indicated in Fig. 15.

Fig. 16 shows a general view of the apparatus, 41 indicating the supply reservoir of liquid to be treated and 42 the reservoir for supply cooling water, which, in this case, is allowed to run directly on to the top plate of the container. The apparatus above which a lamp 3 capable of emitting ultra-violet rays is supported, is supplied with the liquid to be treated and the outlet pipe 22 leads to the receiver 43 in which the liquid, sterilized milk for example, is collected. The pipe 44 leads from the receiver to a vacuum pump (not shown) in order that suction may be employed for drawing the liquid through the apparatus. The tube 45 provided with a cock 46 is required in some cases for aerating the liquid after treatment filtering material 47 being provided in the tube in order to prevent contamination of the liquid with dust.

In sterilization of milk it is of great importance as above mentioned that air should be excluded on account of the undesirable effects of oxidation. It is therefore necessary to prevent air from mixing with the liquid and to have a fairly rapid stream flowing through the apparatus in spite of the thinness of the film, and the rapidity of flow of the milk through the apparatus should be such that little or no oxidation may occur. In order to prevent air coming in contact with the liquid the conduit leading from the supply reservoir to the apparatus should be constructed so that no air-pockets can form. If compressed air is used for forcing the liquid through the apparatus it should not be brought into direct contact with the liquid because air under pressure would rapidly dissolve in the milk. This would result in oxidation under the influence of the ultra-violet rays and furthermore would cause an emulsion to be formed after the liquid leaves the apparatus. The use of reciprocating pumps is undesirable because they tend to produce butter in the milk which is not only unsatisfactory in itself but also chokes the narrow passages between the plates. We therefore employ any suitable means for forcing the liquid through the apparatus under pressure provided the same will prevent air from mixing with the liquid.

One advantage of forcing liquid through the apparatus under pressure is that in the event of leakage at any of the joints liquid will be exuded therefrom but air will not enter. If, however, it is desirable in the arrangement of the apparatus to use suction for passing the liquid milk, for instance, through the apparatus the joints are sealed hydraulically so that if the joints are not tight the liquid in the hydraulic seals will leak into the apparatus and contamination of the liquid under treatment by air will be avoided.

What we claim is:—

1. In an apparatus for treating liquids by means of ultra-violet rays, the combination of two plates one of which is composed of material permeable to ultra-violet rays, a ring of material separating said plates, means for clamping said plates and separator together and inlet and outlet passages leading to the space thus formed between the two plates.

2. In apparatus for treating liquids by means of ultra-violet rays, the combination of two plates one of which is composed of rock crystal, a ring of material separating said plates, means for clamping said plates and separator together and inlet and outlet passages leading to the space thus formed between the two plates.

3. In apparatus for treating liquids by means of ultra-violet rays, the combination with a pair of plates one of which is composed of material permeable to ultra-violet rays, a ring of material separating said plates and inlet and outlet passages leading to the space thus formed between said plates, of a mercury vapor electric lamp having a quartz container located adjacent to that plate which is permeable by ultra-violet rays.

4. In apparatus for treating liquids by means of ultra-violet rays, the combination with a pair of plates having a space between them through which said liquid is passed and a source of ultra-violet rays located adjacent to one of said plates, of means for positively cooling said plates and the liquid passing therebetween.

5. In apparatus for treating liquids by means of ultra-violet rays, the combination of two plates one of which is composed of material permeable to said rays, said plates being separated to form a chamber of small dimensions in the direction perpendicular to the surface of said plates, inlet and outlet pipes to said chamber and means for forcing a current of liquid to be treated through said chamber.

6. In apparatus for treating liquids by means of ultra-violet rays, the combination with a pair of plates having a space between them through which said liquid is passed and a source of ultra-violet rays located adjacent to one of said plates, of means for cooling said plates and the liquid passing therebetween.

7. In apparatus for treating liquids by means of ultra-violet rays the combination with a pair of plates having a space between them through which said liquid is passed and a source of ultra-violet rays located adjacent to said plates, of means for cooling the outer surface of one of said plates to a temperature below that of the surrounding atmosphere.

8. In apparatus for treating liquids by means of ultra-violet rays the combination with a pair of plates having a space between them through which said liquid is passed and a mercury vapor lamp having a quartz container located adjacent to one of said plates, of means for supplying cooling water to one of said plates to cool the liquid passing between them.

In testimony whereof we have hereunto subscribed our names this twentieth day of July, 1911.

VICTOR HENRI.
ANDRÉ HELBRONNER.
MAX von RECKLINGHAUSEN.

Witnesses:
JOHN BAKER,
BARTLEY F. YOST.